United States Patent [19]
Stammen

[11] Patent Number: 5,245,144
[45] Date of Patent: Sep. 14, 1993

[54] WALK ALONG HAND GRIP SWITCH CONTROL FOR PALLET TRUCK

[75] Inventor: Harold A. Stammen, New Bremen, Ohio

[73] Assignee: Crown Equipment Corporation, New Bremen, Ohio

[21] Appl. No.: 783,567

[22] Filed: Oct. 25, 1991

[51] Int. Cl.⁵ .............................................. H01H 9/06
[52] U.S. Cl. .................................................. 200/61.85
[58] Field of Search ............... 200/50 C, 61.85, 332.1, 200/332.2; 180/19.1, 19.3

[56] References Cited

U.S. PATENT DOCUMENTS

| | | | |
|---|---|---|---|
| 1,911,872 | 8/1929 | Bacon | 180/318 |
| 3,190,994 | 6/1965 | Becker et al. | 200/61.85 |
| 3,465,841 | 9/1969 | Pulskamp et al. | 200/332.1 X |
| 3,511,951 | 5/1970 | Miller | 200/50 C |
| 3,557,893 | 1/1971 | Kohls | 200/61.85 X |
| 3,724,586 | 5/1971 | Goodacre | 180/274 |
| 3,738,441 | 3/1972 | Kemner | 180/65.1 |
| 3,834,249 | 9/1974 | Bothwell | 200/61.85 X |
| 4,444,284 | 4/1984 | Montemurro | 200/61.85 X |
| 4,570,078 | 2/1986 | Yashima et al. | 200/61.85 X |
| 4,710,599 | 12/1987 | Motodate et al. | 200/61.85 |
| 4,716,980 | 2/1986 | Butler | 180/19.2 |
| 4,981,121 | 1/1991 | Tani | 200/61.85 X |

Primary Examiner—J. R. Scott
Attorney, Agent, or Firm—Biebel & French

[57] ABSTRACT

An improved switch assembly for use with a materials handling truck includes a pair switches that are conveniently placed in a natural position for actuation by an operator while walking along side the truck. The pair of switches are so placed on each side of a steering control handle to prevent inadvertent actuation and therefore inadvertent operation of the truck. One of the pair is operated by the thumb while the other is positioned to be operated by the fingers as the operator grasps the handle. A control circuit responds to the operation of both switches on one side to move the truck forward at a predetermined speed.

4 Claims, 5 Drawing Sheets

WALK ALONG HAND GRIP SWITCH CONTROL FOR PALLET TRUCK

BACKGROUND OF THE INVENTION

This invention relates to a control handle and system for controlling the operation of a materials handling truck, particularly by an operator walking along side the truck.

A typical rider pallet truck comprises a power unit, a steering control unit and load carrying forks. The power unit contains a steerable wheel, an electric traction motor and an electric storage battery. The power unit also includes a platform onto which the operator may step and ride while controlling the truck. The steering control unit includes a handle which the operator uses to control steering and it also contains operator controls such as twist grips for controlling the direction (forward and reverse) and speed of the truck, a coast control, braking control, controls for raising and lowering the forks, a horn switch and a reversing switch. The load carrying forks extend rearwardly from the power unit and usually have small wheels near the rearmost position to aid in supporting the load.

When the truck is moved in one increment over long distances, four or more bays (36 feet or more), the operator will usually step up onto the truck and ride. In modern warehouses, an order picking procedure is usually organized in such a way that the operator follows a unidirectional serpentine route through the storage area, picking up stock in a predetermined sequence in order to maximize productivity. Since it is inefficient for the operator to ride the truck when moving only short distances, the operator will usually place the truck in its coast mode and walk along side, picking up the materials from the storage area and placing those materials on a pallet on the forks.

Control of the truck's steering while either riding or walking is done by using a conventional steering control handle. Some trucks have been provided with a side control switch placed for use by the operator to control forward motion of the truck.

In a typical operation, the operator may use the side switch to accelerate the truck to walking speed. When approaching a stopping point, the operator will release the switch and allow the truck to coast while the operator moves to an adjacent rack or shelf to pick up an item and place it on a pallet on the forks. The operator plans the coast of the truck so that the pallet on the forks will stop near the operator's position about the same time the operator is ready to place the item on the pallet. After loading the truck, the operator then again operates the side switch and moves the truck toward the next pick up position.

The rate of acceleration and speed of the truck may be controlled by jogging the side switch on and off. The coast distance may be controlled by limiting the truck's travel speed prior to releasing the side switch, and of course the time when the side switch is actually released. Generally, the brakes are not needed during this mode of operation although the truck's brakes are of course available for any emergency. It is clear that inadvertent operation of the side switch must be avoided as well as in providing a side switch that is easily operated by the operator.

SUMMARY OF THE INVENTION

This invention relates to an improved side switch for use with a materials handling truck, and particularly to a pair of switches that are conveniently placed in a natural position for the operator while walking along side the truck.

In the present invention, a pair of switches are placed on each side on the steering control handle. A pair of switches is used to prevent inadvertent operation of the truck. One of the pair is operated by the thumb while the other is positioned to be operated by the fingers as the operator grasps the handle.

The steering control unit used in one form of pallet truck includes a handle attached to the outer end of a tiller, the handle itself including a yoke assembly, a central compartment containing several switches for control of various truck functions, and a pair of twist grips, either one of which may be rotated to control the direction of travel and well as the speed of the truck. The handle may be similar to that described in U.S. Pat. No. 3,465,841. Braking of the vehicle is done by positioning the tiller either horizontally or vertically.

A control circuit responds to the operation of the side switches to move the truck forward at a predetermined speed.

It is therefore an object of this invention to provide a control handle for a walk along materials handling truck comprising a U-shaped control handle base member having a cross member and a pair of arms, first and second switches placed on either side of said handle for permitting the operation of the truck by an operator walking along side, on each side of said handle a first switch actuator positioned at the end of said arm to be operated by the thumb as the operator grips said arm, a second switch actuator positioned away from the end of said arm to be operated by the fingers as the operator grips said arm, and control circuit means responsive to the actuation of both switches on one side of said handle to move the truck in its forward direction up to a predetermined speed.

It is a further object of this invention to provide a materials handling truck that includes a control handle for permitting the operator to walk along the side of the truck while controlling control the forward travel of movement of the truck, the improvement comprising, means forming a hand grip on each side of the control handle, first and second switches placed on each side of the control handle, a first switch actuator associated with said first switch on each side of the control handle and positioned to be operated by the thumb as the operator grasps said hand grip, a second switch actuator associated with said second switch on each side of the control handle and positioned to be operated by the fingers as the operator grasps said hand grip, and control circuit means responsive to the actuation of both switches on one side of the control handle to move the truck in its forward direction up to a predetermined speed.

Other objects and advantages of the invention will be apparent from the following description, the accompanying drawings and the appended claims.

DESCRIPTION OF THE PREFERRED EMBODIMENT

Figure 1:
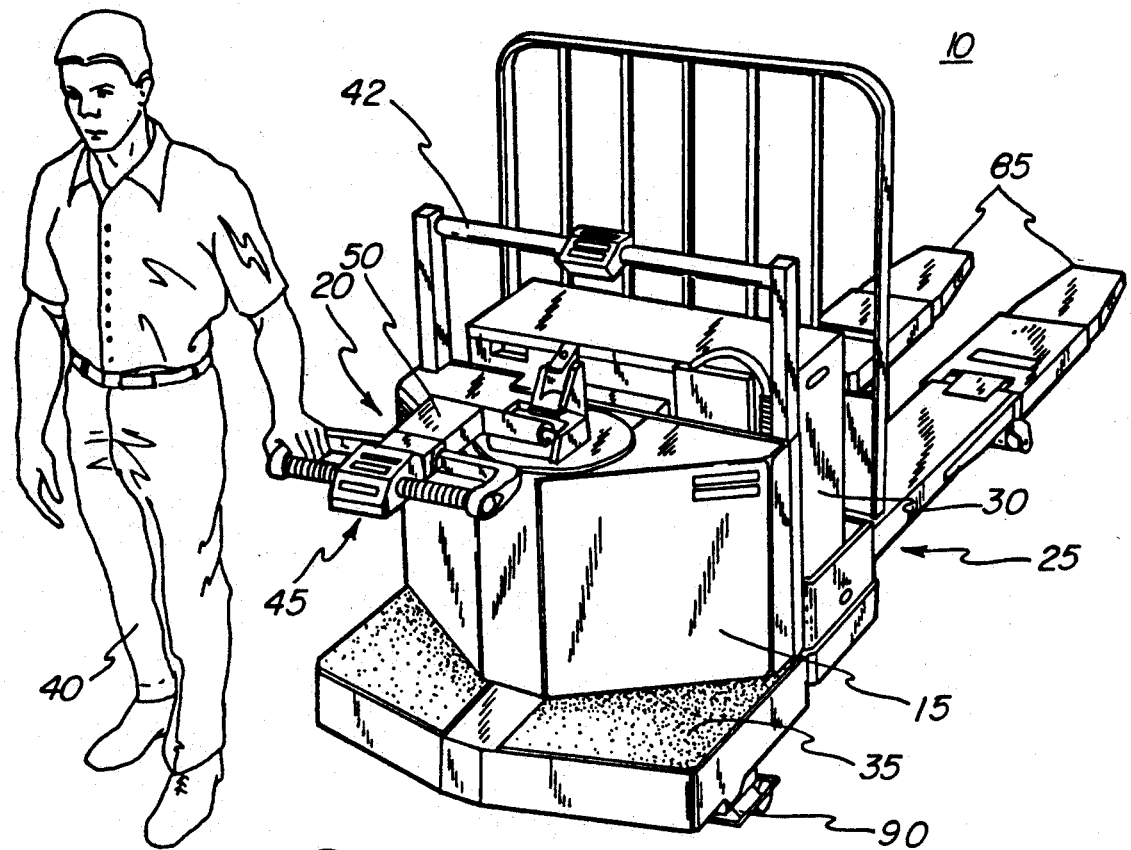
FIG. 1 is a perspective view of a rider pallet truck of the type incorporating the present invention.

Referring now to the drawings which illustrate a preferred embodiment of this invention, and particularly to FIG. 1, a typical rider pallet truck 10 includes a power unit 15, a steering control unit 20, and load carrying forks 25. The power unit 15 contains a steerable wheel (not shown), usually located directly under the steering control unit, an electric traction motor (not shown), and an electric storage battery 30. The power unit 15 also includes a platform 35 onto which an operator 40 may step and ride while controlling the truck 10. A rail 42 is provided for the operator to grip while riding on the platform.

The steering control unit 20 includes a handle 45 mounted at the end of an arm 50 which the operator uses to control steering and other truck functions. The handle 45 also contains operator controls, such as twist grips 55 for controlling the direction (forward and reverse), a reversing switch 65, switches 70 and 75 for controlling the raising and lowering the forks 25, and a horn switch 80.

The load carrying forks 25 extend rearwardly from the power unit 15 and includes small wheels 85 near their rearmost position to aid in supporting a load placed on the forks. Outrigger wheels 90 on the power unit are also provided.

Figure 2:
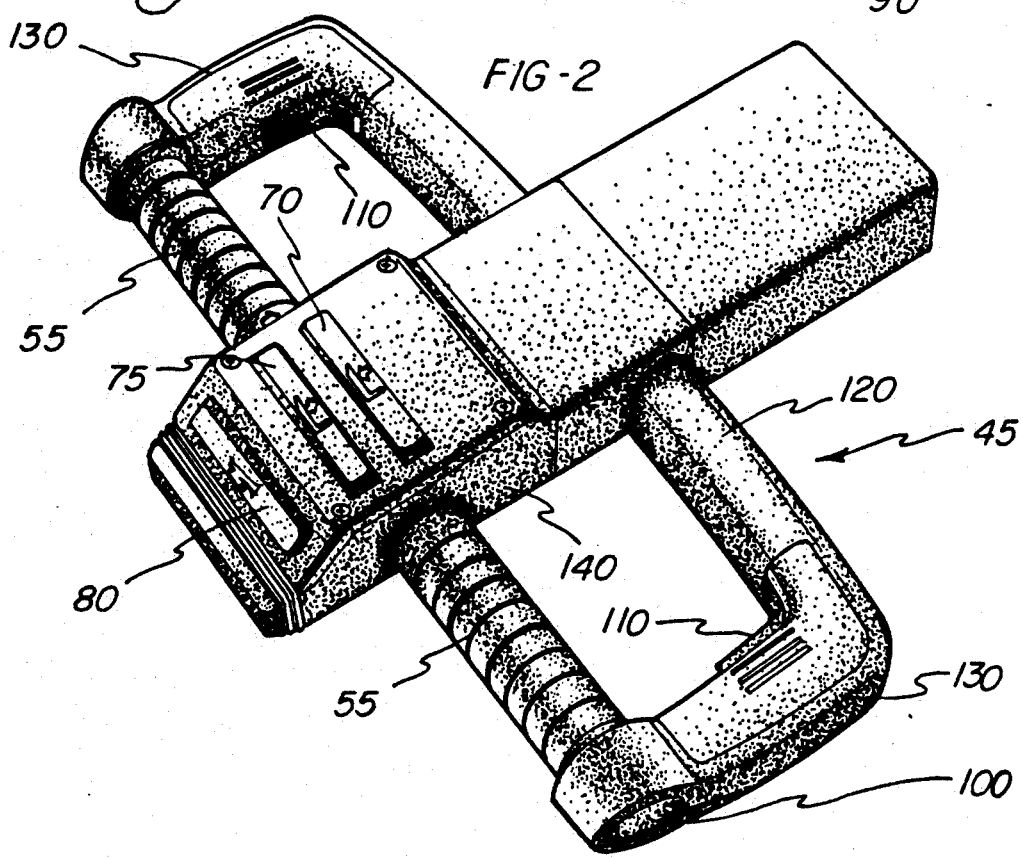
FIG. 2 is a perspective view of a control handle incorporating the present invention.
Figure 3:
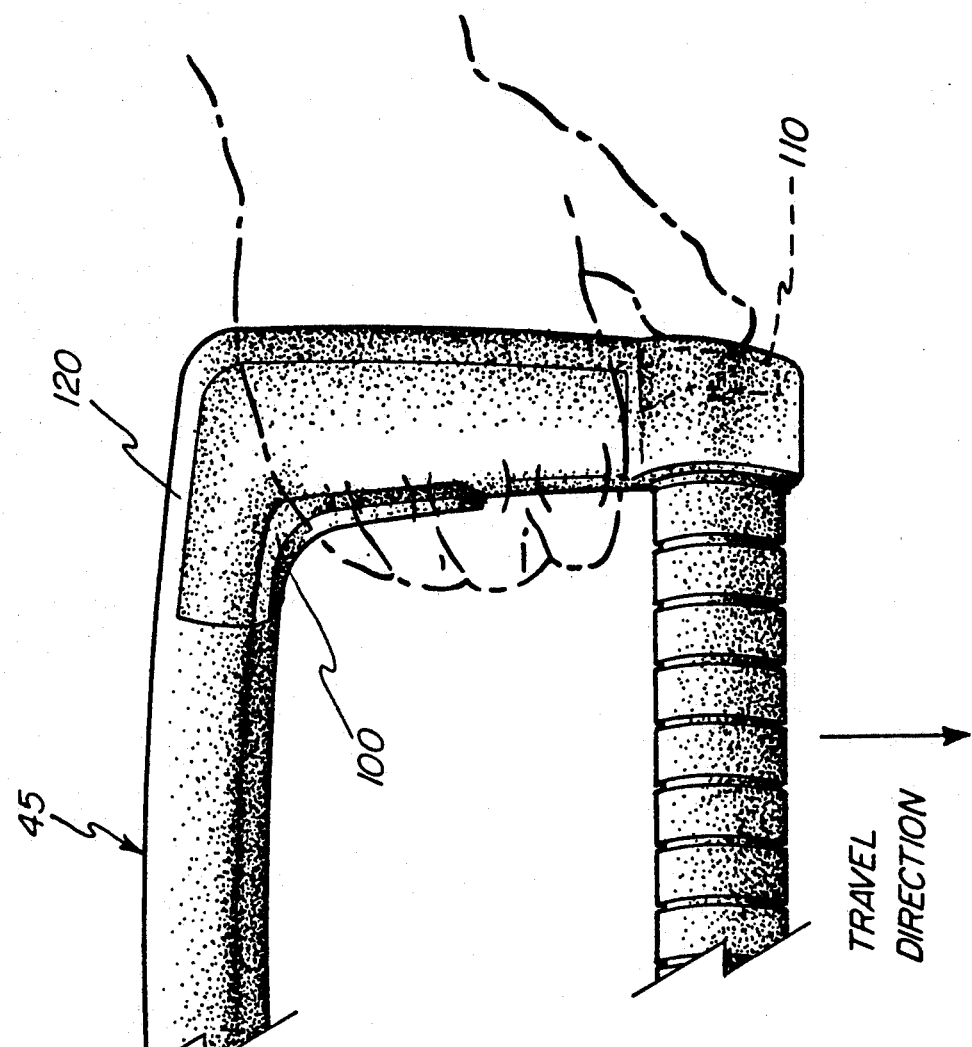
FIG. 3 is a plan view showing the operator's hand grasping the control handle and operating the two switches that permit auxiliary control of the truck.

The arm 50 is moved from side to side to control the direction of the truck, and it may be moved either horizontal or vertical to apply the brakes. The truck will be reversed should the operator make contact with the switch 65 located at the forward part of the handle 45, as shown in FIG. 2. The direction and speed of the truck is controlled by the position of the twist grips 55. These grips are spring biased to a center neutral position. Rotating either grip forward will cause the truck to move forward at a speed proportional to the amount of rotation. Similarly, rotating the grips toward the rear will cause the truck to move in reverse.

When the operator is walking beside the truck, as shown in FIG. 1, the truck may be moved in the forward direction at a predetermined low speed by operation of a side operated pair of switches 100 and 110. There are two sets of side switches, a pair on each side of the handle 45.

The handle includes a U-shaped base member 120 including a cross member 125 and a pair of arms 130. A mounting member 135 is carried at the center of said base member 120, and a truck electrical control housing 140 is attached thereto, as shown in FIG. 2. The pair of rotatable handles 55 extend from the ends of the arms 130 to the control housing 140 for controlling the speed and direction of motion of the truck. The mounting member 135 is also connected to the arm 50.

Figure 4:
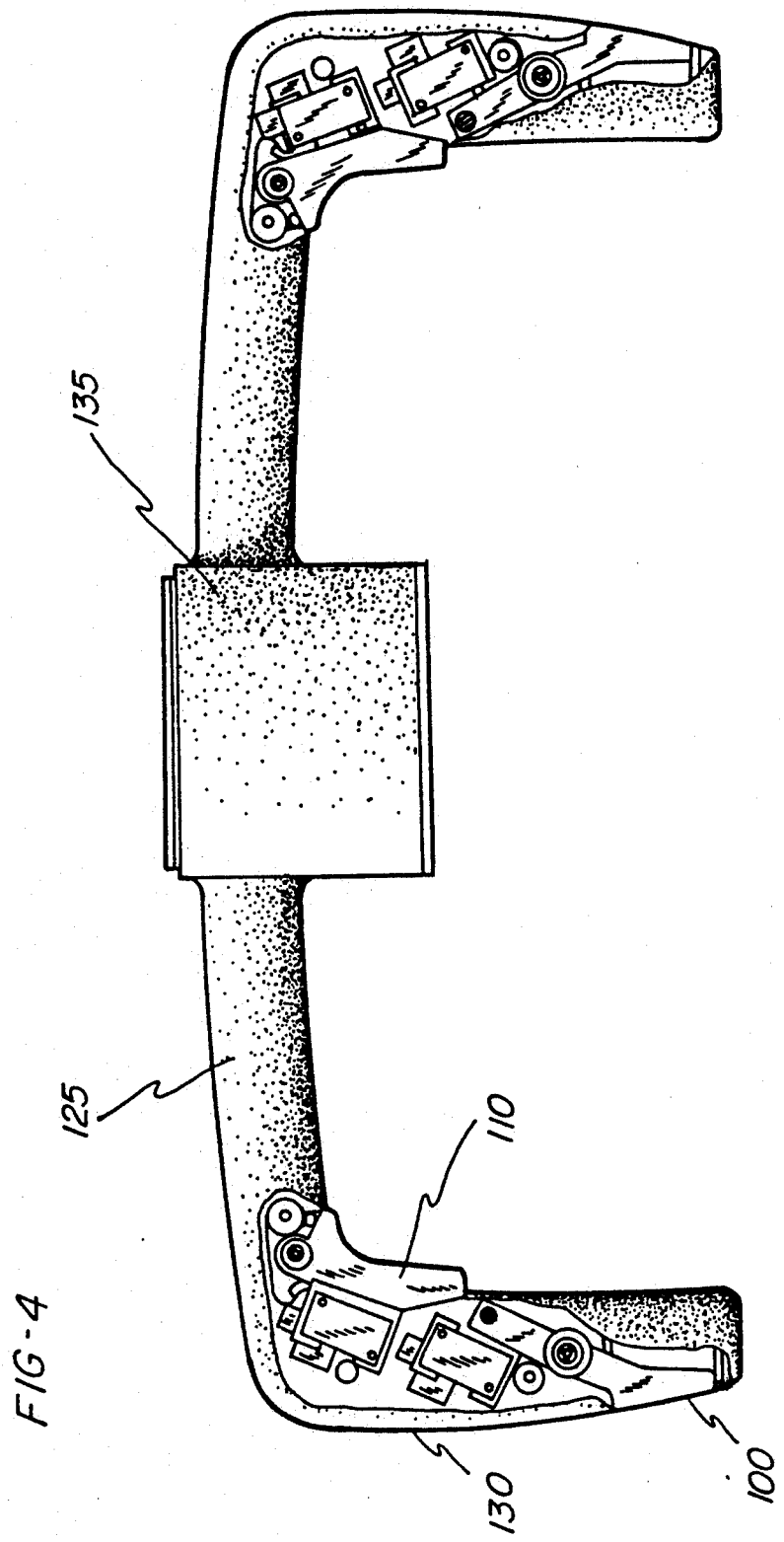
FIG. 4 is a plan view of the control handle with portions broken away to show the position of the auxiliary switches.
Figure 5:
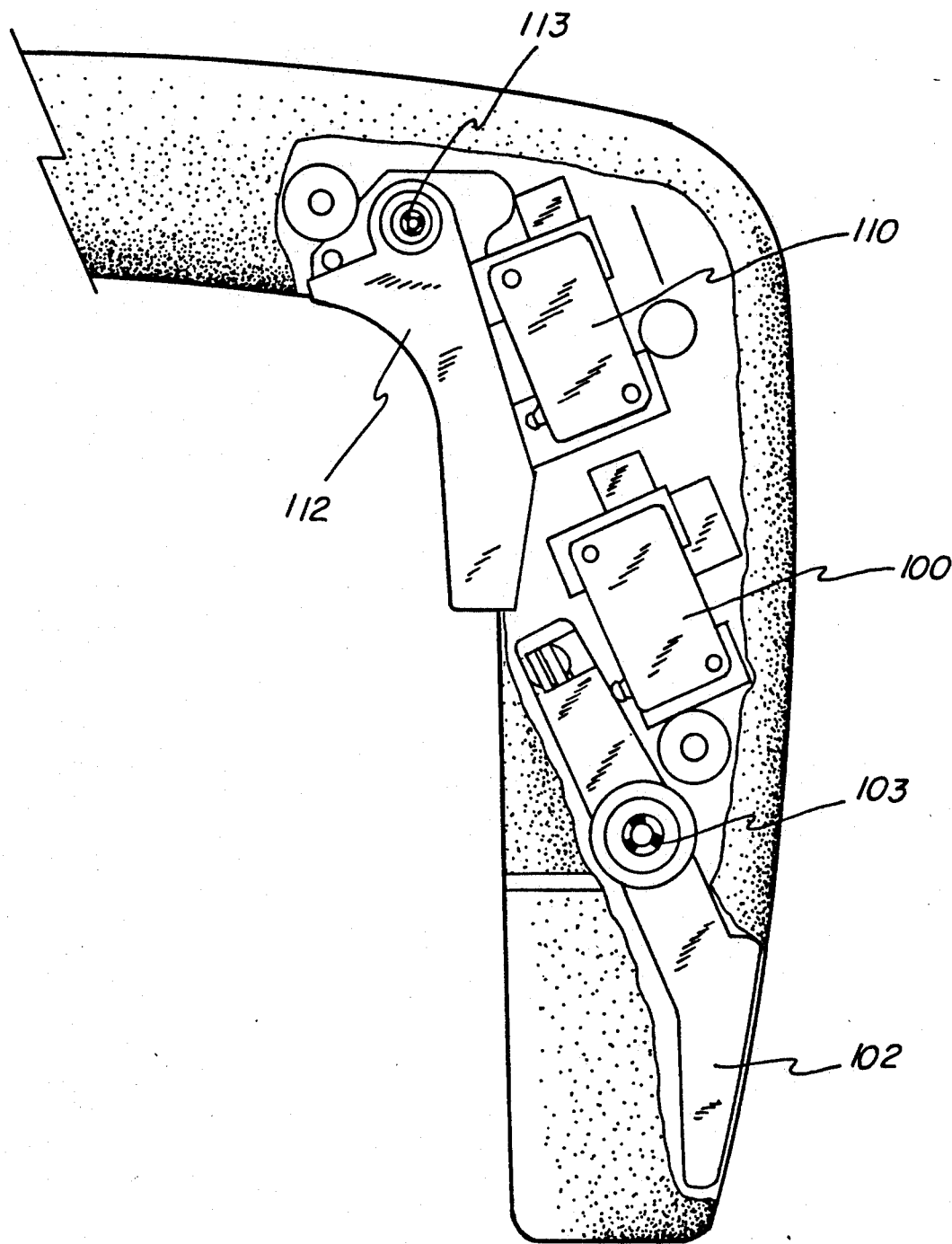
FIG. 5 is a plan view of the handle with a portion broken away to show the auxiliary switches and switch actuators within the handle.

The first and second switches 100 and 110 are placed on either side of the handle 45, as shown in more detail in FIGS. 4 and 5. Switch 100 includes a switch actuator 102 positioned at the end of the arm 130 to be operated by the thumb as the operator grips the arm. The actuator 102 is pivoted at 103 with one end exposed for operation by the thumb and the other end positioned to operate the switch element 105. Switch 110 includes a second switch actuator 112 positioned away from the end of the arm 130 to be operated by the fingers as the operator grips the arm. Actuator 112 is pivoted at 113 and actuates switch element 115.

Figure 6:
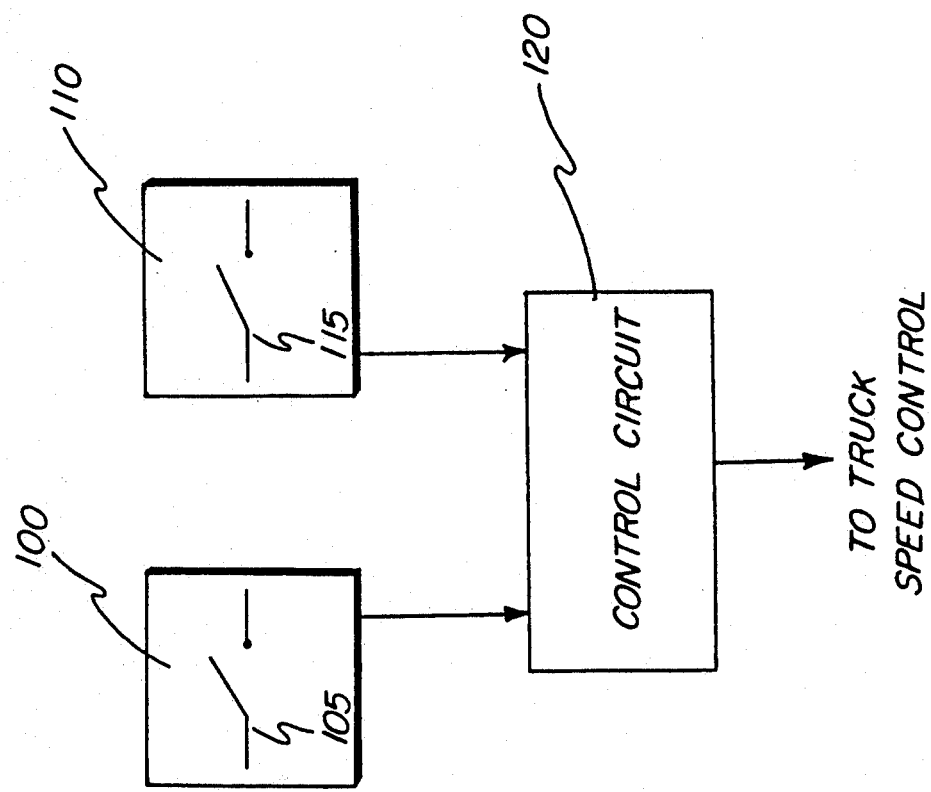
FIG. 6 is a simplified electrical block diagram of a control circuit responsive to the actuation of both switches to control the movement of a truck.

A control circuit mounted in base member 120, shown in FIG. 6, responds to the operation of both switches 100, 110 on one side of said handle to cause the truck to move in its forward direction at a predetermined speed.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A control handle for a walk along materials handling truck comprising
   a control handle base member having a cross member and a pair of arms extending from said cross member, the length of said arms being sufficient for gripping by an operator walking along the side of said truck,
   in each arm,
   a first switch actuator positioned toward the forward end and on the outside of said arm so as to be operable by the thumb as the operator grips said arm,
   a first switch mounted in said control handle which is operated by said first switch actuator when the operator presses on said first switch actuator with the thumb,
   a second switch actuator positioned away from the forward end and on the inside of said arm so as to be operable by the fingers as the operator grips said arm, and
   a second switch mounted in said control handle which is operated by said second switch actuator when the operator grips the second switch actuator with one or more fingers.

2. The control handle for a walk along materials handling truck of claim 1 further including control circuit means responsive to the simultaneous operation of said first and second switches in either arm to move the truck in its forward direction.

3. In a materials handling truck that includes a control handle for permitting the operator to walk along side of the truck while controlling the forward travel of movement of the truck,
   the improvement comprising,
   means forming a hand grip on each side of the control handle,
   a first switch actuator mounted in each hand grip so located as to be operated by the thumb as the operator grasps said hand grip;
   a first switch mounted in said control handle which is operated by said first switch actuator when the operator presses on said first switch actuator with the thumb, a second switch actuator mounted in each hand grip and so located as to be operated by the fingers as the operator grasps said hand grip, and a second switch mounted in said control handle which is operated by said second switch actuator when the operator grasps the second switch actuator with one or more fingers.

4. The control handle for a walk along materials handling truck of claim 3 further including control circuit means responsive to the simultaneous operation of said first and second switches to move the truck in its forward direction.

* * * * *